(12) United States Patent
Kaneta et al.

(10) Patent No.: US 10,632,984 B2
(45) Date of Patent: Apr. 28, 2020

(54) BRAKE CONTROL DEVICE FOR SADDLE RIDING VEHICLE

(71) Applicants: HONDA MOTOR CO., LTD., Tokyo (JP); ROBERT BOSCH GMBH, Stuttgart (DE)

(72) Inventors: Hiroyuki Kaneta, Wako (JP); Yoshiaki Sawano, Wako (JP); Hiroshi Kurata, Wako (JP); Atsushi Nakamura, Yokohama (JP)

(73) Assignees: HONDA MOTOR CO., LTD., Tokyo (JP); ROBERT BOSCH GMBH, Stuttgart (DE)

( * ) Notice: Subject to any disclaimer, the term of this patent is extended or adjusted under 35 U.S.C. 154(b) by 255 days.

(21) Appl. No.: 15/871,465

(22) Filed: Jan. 15, 2018

(65) Prior Publication Data

US 2018/0201248 A1 Jul. 19, 2018

(30) Foreign Application Priority Data

Jan. 18, 2017 (JP) ................................. 2017-006604

(51) Int. Cl.
| | |
|---|---|
| *B60T 13/66* | (2006.01) |
| *B60T 15/04* | (2006.01) |
| *B60T 15/02* | (2006.01) |
| *B60T 13/18* | (2006.01) |
| *B60T 13/16* | (2006.01) |
| *B60T 8/26* | (2006.01) |
| *B60T 17/04* | (2006.01) |
| *B62L 3/02* | (2006.01) |

(52) U.S. Cl.
CPC ............ *B60T 15/043* (2013.01); *B60T 8/261* (2013.01); *B60T 13/161* (2013.01); *B60T 13/18* (2013.01); *B60T 15/028* (2013.01); *B60T 17/04* (2013.01); *B62L 3/023* (2013.01)

(58) Field of Classification Search
CPC ...... B60T 15/028; B60T 15/043; B60T 13/18; B60T 13/161
USPC ....... 303/9.64, 9.69, 9.71, 137, 191; 701/70, 701/72
See application file for complete search history.

(56) References Cited

U.S. PATENT DOCUMENTS

| | | | | |
|---|---|---|---|---|
| 2011/0273005 | A1* | 11/2011 | Westerfeld | ............ B60T 8/1706 303/9.64 |
| 2012/0200148 | A1* | 8/2012 | Waida | ................... B60T 8/3225 303/191 |

(Continued)

FOREIGN PATENT DOCUMENTS

| | | |
|---|---|---|
| EP | 2116436 A1 | 11/2009 |
| EP | 2311703 A1 | 4/2011 |

(Continued)

OTHER PUBLICATIONS

Indian Office Action dated Dec. 19, 2019, 6 pages. English Text Included in Office Action.

*Primary Examiner* — Christopher P Schwartz
(74) *Attorney, Agent, or Firm* — Rankin, Hill & Clark LLP (57) ABSTRACT

The pressure sensor functions as a first detection portion for detecting hydraulic pressure set according to operation of a brake pedal. The control unit detects the hydraulic pressure acting on the second piston portion through the pipe. The control unit controls differential pressure in the detected hydraulic pressure to a target value set according to vehicle speed.

5 Claims, 5 Drawing Sheets

(56) References Cited

U.S. PATENT DOCUMENTS

| | | | |
|---|---|---|---|
| 2013/0238206 A1* | 9/2013 | Lemejda | B60T 8/1706 |
| | | | 701/70 |
| 2015/0057904 A1* | 2/2015 | Nishimura | B60T 8/1706 |
| | | | 701/70 |
| 2019/0256065 A1* | 8/2019 | Ono | B60T 7/12 |

FOREIGN PATENT DOCUMENTS

| | | |
|---|---|---|
| JP | 2015-089699 | 5/2015 |
| WO | 2013/115089 A1 | 8/2013 |

* cited by examiner

BRAKE CONTROL DEVICE FOR SADDLE RIDING VEHICLE

INCORPORATION BY REFERENCE

The present application claims priority under 35 U.S.C. § 119 to Japanese Patent Application No. 2017-006604 filed on Jan. 18, 2017. The content of the application is incorporated herein by reference in its entirety.

TECHNICAL FIELD

The present invention relates to a brake control device for a saddle riding vehicle.

BACKGROUND ART

The known motorcycle is configured to include an interlock braking system (also called a combined brake system). With regard to the interlock braking system, even if brake operation is performed with respect to a rear wheel only, both a rear wheel brake and a front wheel brake are operated. This kind of motorcycle (see, for example, Patent Literature 1) is configured in such a manner that an opening of a rear wheel-side closing valve is controlled based on brake control force and information on target braking force, the brake control force being detected by a pressure sensor and acting on the rear wheel.

CITATION LIST

Patent Literature

[Patent Literature 1]
JP-A No. 2015-89699

SUMMARY OF INVENTION

Technical Problem

However, in the existing structure, the information on the target braking force is used only for control of the rear wheel brake, and is not used for control of the front wheel brake. For this reason, the control of the front wheel brake is performed independently of the control of the rear wheel brake, and there is room for improvement of brake feeling. Also, in the existing structure, the control is targeted to suppress early operation of an ABS (Antilock Brake System), and an object of a technology is not to improve the brake feeling.

With that, an object of the present invention is to enable improvement of the brake feeling of the interlock braking system.

Solution to Problem

In order to achieve the above-described an aspect of the present invention, there is provided a brake control device for a saddle riding vehicle including: a rear wheel brake operation element (21) for operating a rear wheel brake (22); a master cylinder (152) for generating hydraulic pressure according to operation of the rear wheel brake operation element (21); a first detection portion (157) for detecting the hydraulic pressure generated according to the operation of the rear wheel brake operation element (21); a front wheel brake (12); and a flow passage (170) configured to connect the master cylinder (152) and the front wheel brake (12) to each other. The brake control device for the saddle riding vehicle further includes: a second detection portion (200) for detecting the hydraulic pressure acting on the front wheel brake (12) through the flow passage (170); and a control unit (200) for controlling a difference in the hydraulic pressure to a target value, the difference in the hydraulic pressure being detected by the first and second detection portions (157, 200), the target value being set according to vehicle speed of the saddle riding vehicle.

In the above-described structure, the control unit (200) may set the target value to a smaller value as the vehicle speed is higher.

Also, in the above-described structure, the control unit (200) may set as the target value a value set according to an original vehicle speed with the rear wheel brake operation element (21) operated.

Also, in the above-described structure, the brake control device for the saddle riding vehicle may furthermore include an opening regulating valve (171) for regulating an opening of the flow passage (170). The control unit (200) may control the opening of the opening regulating valve (171) in order to set the difference in the hydraulic pressure to the target value.

Also, in the above-described structure, the second detection portion (200) may specify the hydraulic pressure acting on the front wheel brake (12) through the flow passage (170) based on the hydraulic pressure detected by the first detection portion (157) and the opening of the opening regulating valve (171).

Advantageous Effects of Invention

In the aspect of the present invention, the control unit controls to the target value the difference between the hydraulic pressure set according to the operation of the rear wheel brake operation element and the hydraulic pressure acting on the front wheel brake through the flow passage for connecting the master cylinder and the front wheel to each other, the target value being set according to the vehicle speed of the saddle riding vehicle. For this reason, during manipulation of the rear wheel brake operation element, the front wheel can be finely braked by braking force set according to the vehicle speed, and the brake feeling of the combined brake is improved.

Also, the control unit sets the target value to the smaller value as the vehicle speed is higher. For this reason, the brake control for enabling efficient braking is achieved when the vehicle speed is higher, and the brake control advantageous to suppression of pitching of a vehicle body is achieved when the vehicle speed is lower.

Also, the control unit sets as the target value the value set according to the original vehicle speed with the rear wheel brake operation element operated. For this reason, a change in the target value is suppressed during operation of the combined brake, and stable brake feeling is obtained.

Also, the control unit varies the target value according to time elapsing from the manipulation of the rear wheel brake operation element. For this reason, the control of the combined brake can be varied according to the vehicle speed and the time, and finer braking can be achieved. As a result, the brake feeling is more easily improved.

Also, the brake control device for the saddle riding vehicle furthermore includes the opening regulating valve for regulating the opening of the flow passage. The control unit controls the opening of the opening regulating valve in order to set the difference in the hydraulic pressure to the target value. For this reason, the brake feeling is improved by a simple structure.

Also, the second detection portion specifies the hydraulic pressure acting on the front wheel brake through the flow passage based on the hydraulic pressure detected by the first detection portion and the opening of the opening regulating valve. For this reason, the pressure sensor for detecting the hydraulic pressure acting on the front wheel brake is no more required, and this configuration is advantageous to reduce the number of components.

DESCRIPTION OF EMBODIMENTS

An embodiment of the present invention will be described below with reference to drawings.

Figure 1:
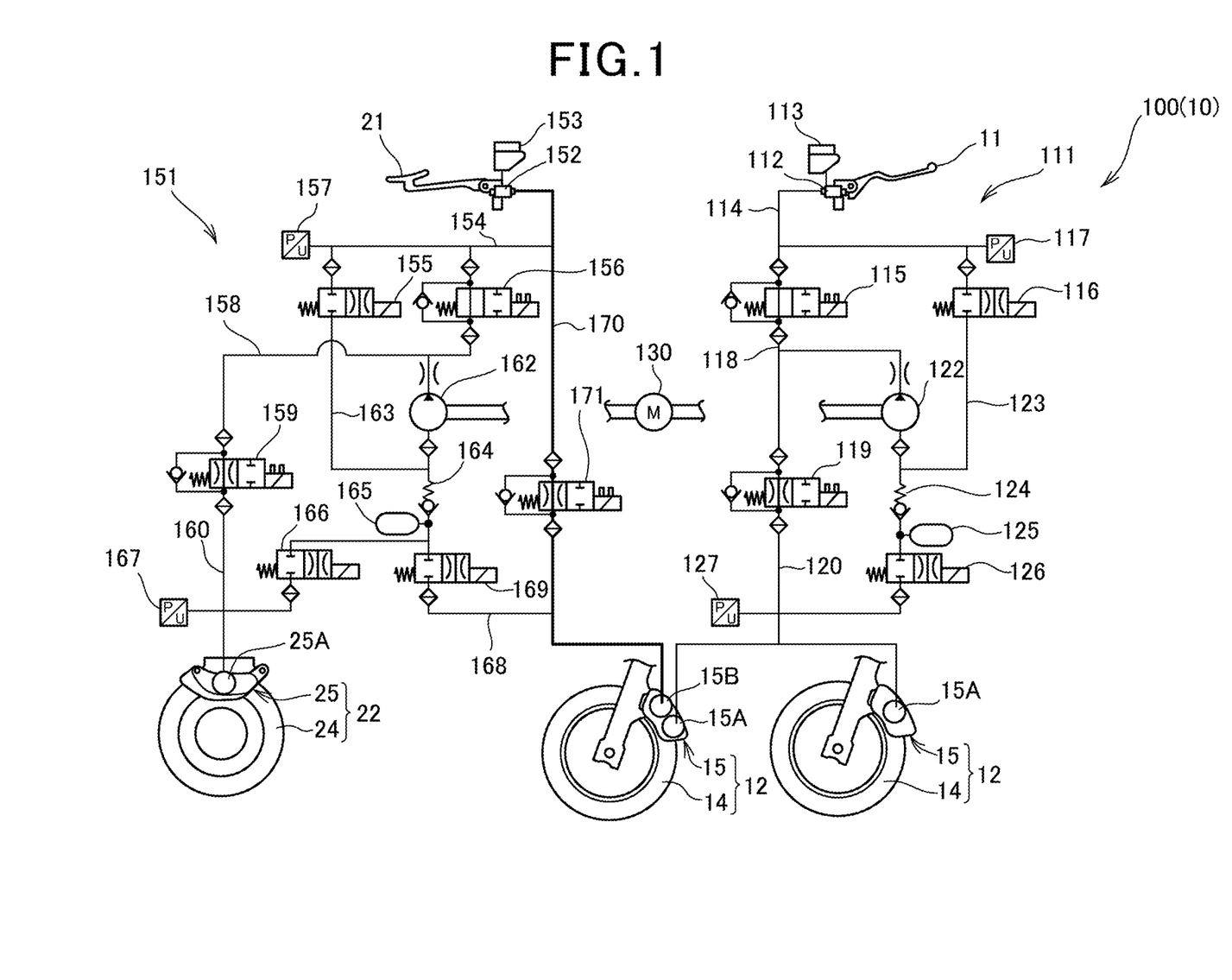
FIG. 1 is a drawing showing a hydraulic circuit of a brake system for a motorcycle according to an embodiment of the present invention.

FIG. 1 is a drawing showing a hydraulic circuit 100 of a brake system 10 for a motorcycle according to the embodiment of the present invention.

The brake system 10 is mounted in a large-sized motorcycle classified into, for example, a large-sized tourer, and functions as a brake control device of the present invention. The brake system 10 is provided with a hydraulic circuit (also called oil-hydraulic circuit) 100, and a control unit 200 (FIG. 2 described later) functioning as a control unit for controlling the hydraulic circuit 100.

The hydraulic circuit 100 is configured with a first hydraulic circuit 111 and a second hydraulic circuit 151. The first hydraulic circuit 111 activates a front wheel brake 12 by manipulation of a brake lever 11 as a front wheel brake operation element. The second hydraulic circuit 151 activates a rear wheel brake 22 and the front wheel brake 12 by operation of a brake pedal 21 as a rear wheel brake operation element.

The front wheel brake 12 is configured with a hydraulic disc brake device. The front wheel brake 12 is provided with a front brake disc 14 and a front wheel caliper 15. The front brake disc 14 is rotated integrally with the front wheel. The front wheel caliper 15 performs braking by pressing frictional material to the front brake disc 14.

The front wheel caliper 15 is provided with a first piston portion 15A and a second piston portion 15B. The first piston portion 15A presses the frictional material by the hydraulic pressure (equivalent to fluid pressure of brake fluid) from the first hydraulic circuit 111. The second piston portion 15B presses the frictional material by the hydraulic pressure from the second hydraulic circuit 151.

The rear wheel brake 22 is configured with the hydraulic disc brake device in the same way as the front wheel brake 12. The rear wheel brake 22 is provided with a rear brake disc 24 and a rear wheel caliper 25. The rear brake disc 24 is rotated integrally with the rear wheel. The rear wheel caliper 25 performs braking by pressing the frictional material to the rear brake disc 24. The rear wheel caliper 25 has a piston portion 25A. The piston portion 25A presses the frictional material by the hydraulic pressure from the second hydraulic circuit 151.

The first hydraulic circuit 111 is provided with a front wheel-side master cylinder 112, a front wheel-side reservoir tank 113, a front wheel-side selector valve 115, and a front wheel-side high-pressure inlet valve 116. The front wheel-side master cylinder 112 generates the hydraulic pressure set according to the manipulation of the brake lever 11. The front wheel-side reservoir tank 113 is connected to the front wheel-side master cylinder 112, and stores a part of the brake fluid. The front wheel-side selector valve 115 is connected to the front wheel-side master cylinder 112 through a pipe 114. The front wheel-side high-pressure inlet valve 116 is connected to the front wheel-side master cylinder 112 through the pipe 114. Respective filters are provided to a connection between the pipe 114 and the front wheel-side selector valve 115, and a connection between the pipe 114 and the front wheel-side high-pressure inlet valve 116.

The pipe 114 and respective pipes described later function as brake fluid flow passages. In the pipe 114, a pressure sensor 117 is provided for detecting the hydraulic pressure in the pipe 114. The pressure sensor 117 detects the hydraulic pressure set according to the manipulation of the brake lever 11 by detecting the hydraulic pressure between the front wheel-side master cylinder 112 and the front wheel-side selector valve 115, and between the front wheel-side master cylinder 112 and the front wheel-side high-pressure inlet valve 116. That is, the pressure sensor 117 functions as the detection portion for detecting the brake control force with respect to the front wheel. A result detected by the pressure sensor 117 is output to the control unit 200.

The front wheel-side selector valve 115 is connected with a front wheel-side closing valve 119 through a pipe 118. The respective filters are provided also to a connection between the front wheel-side selector valve 115 and the pipe 118, and a connection between the pipe 118 and the front wheel-side closing valve 119.

The front wheel-side closing valve 119 is connected to the first piston portion 15A of the front wheel caliper 15 through a pipe 120. With this configuration, the hydraulic pressure generated by the front wheel-side master cylinder 112 acts on the first piston portion 15A of the front wheel caliper 15 through the front wheel-side selector valve 115 and the front wheel-side closing valve 119, so that the front wheel brake 12 is operated.

Also, the pipe 118 is connected with a delivery side of a front wheel-side hydraulic pump 122 through a throttle. The front wheel-side hydraulic pump 122 is driven by a motor (for example, a DC motor) 130. A suction side of the front wheel-side hydraulic pump 122 is connected to one end of a pipe 123 through the filter. The other end of the pipe 123 is connected to one end of the front wheel-side high-pressure inlet valve 116. Also, the pipe 123 is connected to the pipe 120 through a front wheel-side check valve 124, a front wheel-side reservoir (accumulator) 125, and a front wheel-side release valve 126. A backflow from the pipe 123 to the front wheel-side reservoir 125 is prevented by the front wheel-side check valve 124. Also, the filter is provided to a connection between the front wheel-side reservoir 125 and the front wheel-side check valve 124.

In the pipe 120, a pressure sensor 127 is provided for detecting the hydraulic pressure in the pipe 120. The pressure sensor 127 detects the hydraulic pressure acting on the first piston portion 15A of the front wheel caliper 15 through the pipe 120. That is, the pressure sensor 127 functions as the detection portion for detecting the pressure actually acting on the first piston portion 15A of the front wheel caliper 15. A result detected by the pressure sensor 127 is output to the control unit 200.

The second hydraulic circuit 151 is provided with a rear wheel-side master cylinder 152 and a rear wheel-side reservoir tank 153. The rear wheel-side master cylinder 152 generates the hydraulic pressure set according to the operation of the brake pedal 21. The rear wheel-side reservoir tank 153 is connected to the rear wheel-side master cylinder 152, and stores a part of the brake fluid. Further, the second hydraulic circuit 151 is provided with a rear wheel-side high-pressure inlet valve 155, and a rear wheel-side selector valve 156. The rear wheel-side high-pressure inlet valve 155 is connected to the rear wheel-side master cylinder 152 through a pipe 154. The rear wheel-side selector valve 156 is connected to the rear wheel-side master cylinder 152 through the pipe 154. Also, the respective filters are provided to a connection between the pipe 154 and the rear wheel-side high-pressure inlet valve 155, and a connection between the pipe 154 and the rear wheel-side selector valve 156.

Further, in the pipe 154, a pressure sensor 157 is provided for detecting the hydraulic pressure in the pipe 154. The pressure sensor 157 detects the hydraulic pressure set according to the operation of the brake pedal 21 by detecting the hydraulic pressure between the rear wheel-side master cylinder 152 and the rear wheel-side high-pressure inlet valve 155, and between the rear wheel-side master cylinder 152 and the rear wheel-side selector valve 156. That is, the pressure sensor 157 functions as the detection portion for detecting the brake control force with respect to the rear wheel. A result detected by the pressure sensor 157 is output to the control unit 200.

Also, the rear wheel-side high-pressure inlet valve 155 is connected with a rear wheel-side closing valve 159 through a pipe 158. The respective filters are provided also to a connection between the rear wheel-side high-pressure inlet valve 155 and the pipe 158, and a connection between the pipe 158 and the rear wheel-side closing valve 159.

The rear wheel-side closing valve 159 is connected to the piston portion 25A of the rear wheel caliper 25 through a pipe 160. With this configuration, the hydraulic pressure generated by the rear wheel-side master cylinder 152 acts on the piston portion 25A of the rear wheel caliper 25 through the rear wheel-side high-pressure inlet valve 155 and the rear wheel-side closing valve 159, so that the rear wheel brake 22 is operated.

Hereat, the rear wheel-side closing valve 159 is a valve configured to enable control to a fully closed condition, a fully opened condition, and an intermediate opening between the fully closed condition and the fully opened condition. The rear wheel-side closing valve 159 functions as an opening regulating valve for changing an opening of the pipe 160 leading to the piston portion 25A in a multistage manner.

Also, the pipe 158 is connected with a delivery side of a rear wheel-side hydraulic pump 162 through a throttle. The rear wheel-side hydraulic pump 162 is driven by the motor 130. A suction side of the rear wheel-side hydraulic pump 162 is connected to one end of a pipe 163 through the filter. The other end of the pipe 163 is connected to one end of the rear wheel-side selector valve 156. Also, the pipe 163 is connected to the pipe 120 through a rear wheel-side check valve 164, a rear wheel-side reservoir (accumulator) 165, and a rear wheel-side first release valve 166. A backflow from the pipe 163 to the rear wheel-side reservoir 165 is prevented by the rear wheel-side check valve 164. Also, the filter is provided to a connection between the rear wheel-side reservoir 165 and the rear wheel-side check valve 164.

Also, in the pipe 160, a pressure sensor 167 is provided for detecting the hydraulic pressure (pressure of brake fluid) in the pipe 160. The pressure sensor 167 detects the hydraulic pressure acting on the piston portion 25A of the rear wheel caliper 25 through the pipe 160. That is, the pressure sensor 167 functions as the detection portion for detecting the pressure actually acting on the rear wheel brake 22. A result detected by the pressure sensor 167 is output to the control unit 200.

In the present embodiment, a pipe 170 is provided. The pipe 170 functions as a flow passage for connecting the rear wheel-side master cylinder 152 and the second piston portion 15B of the front wheel caliper 15 to each other.

The pressure sensor 157 is provided in the middle of the pipe 170. A front combined wheel closing valve 171 is a valve configured to enable control to a fully closed condition, a fully opened condition, and an intermediate opening between the fully closed condition and the fully opened condition. The front combined wheel closing valve 171 functions as an opening regulating valve for changing an opening of the pipe 170 leading to the second piston portion 15B in a multistage manner.

Note that a pipe 168 is provided between the pipe 170 and the rear wheel-side reservoir 165, and a front combined wheel release valve 169 is provided in the pipe 168. With this configuration, a part of the pressurized brake fluid in the pipe 170 can be released to the rear wheel-side reservoir 165 through the front combined wheel release valve 169.

Figure 2:
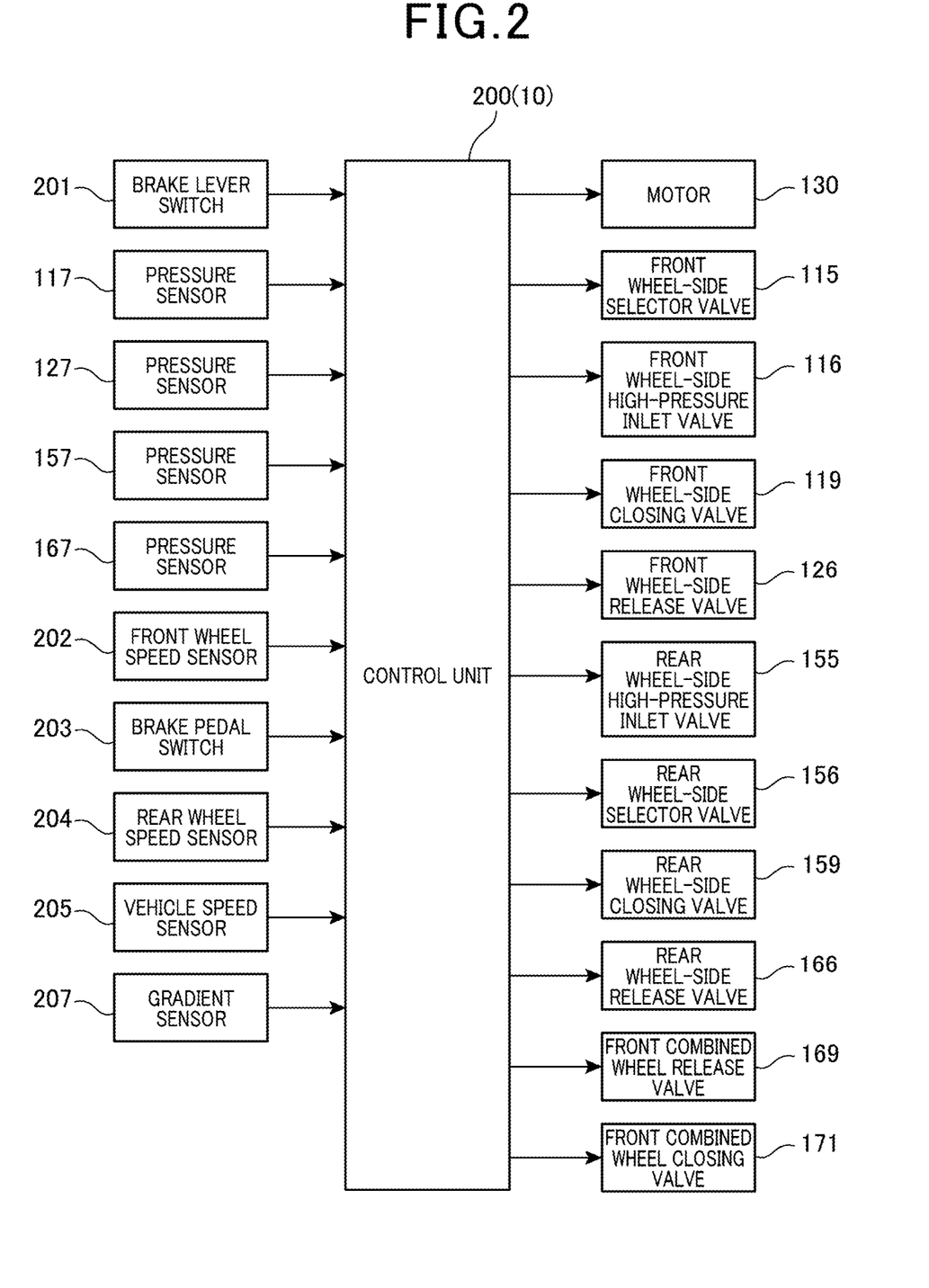
FIG. 2 is a block diagram showing a control unit together with a peripheral configuration.

FIG. 2 is a block diagram showing the control unit 200 together with a peripheral configuration.

The control unit 200 is connected with a brake lever switch 201, the pressure sensors 117, 127, 157, 167, and a front wheel speed sensor 202. The brake lever switch 201 detects actuation of the brake lever 11. The front wheel speed sensor 202 detects rotational speed of the front wheel. Further, the control unit 200 is connected with a brake pedal switch 203, a rear wheel speed sensor 204, and a vehicle speed sensor 205. The brake pedal switch 203 detects operation of the brake pedal 21. The rear wheel speed sensor 204 detects rotational speed of the rear wheel. The vehicle speed sensor 205 detects vehicle speed (traveling speed of the motorcycle).

The brake lever switch 201 outputs a manipulated signal showing the actuation of the brake lever 11 to the control unit 200. The pressure sensors 117, 127, 157 and 167 respectively output to the control unit 200 pressure signals showing respective pressures in the pipes 114, 120, 154 and 160.

The front wheel speed sensor 202 outputs to the control unit 200 a rotational speed signal showing the rotational speed of the front wheel. The brake pedal switch 203 outputs to the control unit 200 an operation signal showing the operation of the brake pedal 21. The rear wheel speed sensor 204 outputs to the control unit 200 a rotational speed signal showing the rotational speed of the rear wheel. The vehicle speed sensor 205 outputs to the control unit 200 a vehicle speed signal showing the vehicle speed. Also, according to the specifications of the motorcycle, the control unit 200 is connected with a gradient sensor 207, an acceleration sensor, a radar sensor and the like.

The control unit 200 controls the respective portions of the hydraulic circuit 100 in compliance with predetermined conditions based on the manipulated signal, the pressure signal, the rotational speed signal and the vehicle speed signal. That is, the control unit 200 controls the motor 130, the respective portions (the front wheel-side selector valve 115, the front wheel-side high-pressure inlet valve 116, the front wheel-side closing valve 119 and the front wheel-side release valve 126) of the first hydraulic circuit 111, and the respective portions (the rear wheel-side high-pressure inlet valve 155, the rear wheel-side selector valve 156, the rear wheel-side closing valve 159, the front combined wheel release valve 169, and the front combined wheel closing valve 171) of the second hydraulic circuit 151.

Also, the control unit 200 performs anti-lock control for controlling the respective portions of the hydraulic circuit 100 in order to prevent locking of the front wheel or the rear wheel when locking of either the front wheel or the rear wheel is detected based on the rotational speed signals from the front wheel speed sensor 202 and the rear wheel speed sensor 204, during braking. The known control can be widely applied to the anti-lock control.

The brake system 10 functions as an interlock braking system (combined brake system) for operating the rear wheel brake 22 and the second piston portion 15B of the front wheel brake 12 when only the rear wheel is braked.

In the brake system 10, as combined brake control, when the rear wheel is braked, a predetermined target value for defining the hydraulic pressure supplied to the second piston portion 15B of the front wheel caliper 15 is set to a target value DT according to the vehicle speed. Herewith, in the combined brake, the second piston portion 15B of the front wheel brake 12 can be operated by the braking force adapted to the vehicle speed.

The combined brake control when the brake pedal 21 is operated and the brake lever 11 is not manipulated will be described. When the brake pedal 21 is stepped, the hydraulic pressure in the rear wheel-side master cylinder 152 is increased, and the increased hydraulic pressure acts on the rear wheel caliper 25 through the pipe 154, the opened rear wheel-side high-pressure inlet valve 155, the pipe 158, the opened rear wheel-side closing valve 159, and the pipe 160 in sequence. Herewith, the piston portion 25A of the rear wheel caliper 25 is operated, so that the rear wheel is braked.

Hereat, the control unit 200 starts the combined brake control while being switched to an operating condition of a combined brake control mode, when an increase in the hydraulic pressure to the rear wheel brake 22 is detected based on the signal from the pressure sensor 157.

As the combined brake control, the control unit 200 performs brake control on the first hydraulic circuit 111 and brake control on the second hydraulic circuit 151. Hereinafter, for the sake of convenience of explanation, the brake control on the first hydraulic circuit 111 is represented as "first brake control", and the brake control on the second hydraulic circuit 151 is represented as "second brake control".

As the first brake control, the control unit 200 performs such control that active pressure intensification is performed with respect to the first hydraulic circuit 111, and the braking is performed by the front wheel.

Specifically, while the control unit 200 closes the front wheel-side selector valve 115, opens the front wheel-side high-pressure inlet valve 116, maintains the opened condition of the front wheel-side closing valve 119, and operates the front wheel-side hydraulic pump 122 by the motor 130. The brake fluid from the front wheel-side reservoir tank 113 is sucked in a suction port of the front wheel-side hydraulic pump 122 through the pipe 114, the front wheel-side high-pressure inlet valve 116 and the pipe 123. Then, the brake fluid is discharged from a discharge port of the front wheel-side hydraulic pump 122, and the hydraulic pressure in the pipe 118 is increased. By the increase in the hydraulic pressure in the pipe 118, the first piston portion 15A of the front wheel caliper 15 is operated through the front wheel-side closing valve 119 and the pipe 120, and the front wheel is braked.

Hereat, in the present structure, the brake control on the front wheel is performed also by the second brake control. Therefore, the brake force of the front wheel by the first brake control is set to lower brake force than the brake force of the front wheel when the second brake control is not performed. Note that the target value of the brake force of the front wheel by the first brake control is set to a value proportional to the hydraulic pressure (the value detected by the pressure sensor 157) set according to the operation of the brake pedal 21. Thereby, the control to achieve the higher front wheel brake force can be performed as the brake control force with respect to the rear wheel is higher.

The second brake control will be explained.

Figure 3:
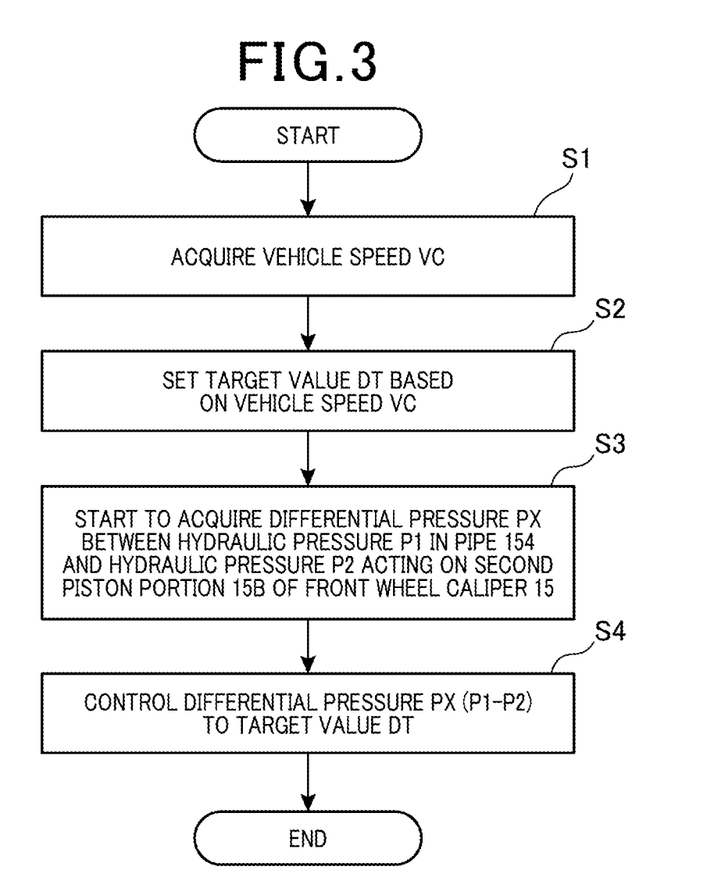
FIG. 3 is a flowchart of second brake control.

FIG. 3 is a flowchart of the second brake control.

The control unit 200 determines that the brake pedal 21 is operated when the increase in the hydraulic pressure set according to the operation of the brake pedal 21 is detected, more specifically, when the increase in the hydraulic pressure P1 in the pipe 154 detected by the pressure sensor 157 is detected, and the vehicle speed VC at the time is acquired by the vehicle speed sensor 205 (Step S1). Thereby, the control unit 200 acquires an original (for example, operation starting time point (timing of time t0 shown in FIG. 5 described later)) vehicle speed VC with the brake pedal 21 as the rear wheel brake operation element operated.

Next, the control unit 200 sets the target value DT based on the vehicle speed VC (Step S2). Hereat, the target value DT is set to a smaller value as the vehicle speed VC is higher.

A method for setting the target value based on, for example, table data with the vehicle speed VC, the hydraulic pressure P1, and the target value DT correlated with each other, or computation type data for computing the target value DT with the vehicle speed VC and the hydraulic pressure P1 as a variable has only to be applied to a method for setting the target value DT.

Next, the control unit 200 starts to acquire differential pressure PX between the hydraulic pressure P1 generated according to the operation of the brake pedal 21 and the hydraulic pressure P2 acting on the second piston portion 15B of the front wheel caliper 15 (Step S3).

Hereat, the hydraulic pressure P1 is the hydraulic pressure in the pipe 154 detected by the pressure sensor 157, and can be directly obtained.

On the other hand, the hydraulic circuit 100 according to the present embodiment is not provided with the pressure sensor for directly detecting the hydraulic pressure P2. The hydraulic pressure P2 is fluid pressure set by the opening of the pipe 170 (the opening of the front combined wheel closing valve 171) and the hydraulic pressure (equivalent to the hydraulic pressure P1) input into the pipe 170 connecting the rear wheel-side reservoir tank 153 and the second piston portion 15B of the front wheel caliper 15 to each other.

With that, in the present embodiment, the control unit 200 processes to estimate the hydraulic pressure P2 based on the hydraulic pressure P1 detected by the pressure sensor 157 and the opening of the front combined wheel closing valve 171. Then, after an estimate value of the hydraulic pressure P2 is acquired, the control unit 200 acquires the differential pressure PX by computing a difference between the hydraulic pressure P1 and the hydraulic pressure P2. A process to acquire the differential pressure PX (equivalent to P1-P2) is continuously performed during the operation of the brake pedal 21. Thereby, the control unit 200 acquires the differential pressure PX during the operation of the brake pedal 21 in real time.

Subsequently, the control unit 200 processes to control the differential pressure PX to the target value DX set according to the vehicle speed VC (Step S4). Specifically, the control unit 200 calculates a current value for controlling the opening of the front combined wheel closing valve 171 in order to set the differential pressure PX to the target value DT, and controls the opening of the front combined wheel closing valve 171 based on the calculated current value. By the above-described control, the differential pressure PX is controlled to the target value DT. Note that feedback control may be applied to the above-described control.

In this case, the differential pressure PX is set to a lower value as the target value DT is set to the lower value. For this reason, the brake force acting on the second piston portion 15B of the front wheel brake 12 approaches the brake force acting on the piston portion 25A of the rear wheel brake 22. On the contrary, the differential pressure PX is set to a larger value as the target value DT is set to the larger value. For this reason, the brake force acting on the second piston portion 15B of the front wheel brake 12 is relatively reduced with respect to the brake force acting on the piston portion 25A of the rear wheel brake 22.

Figure 4:
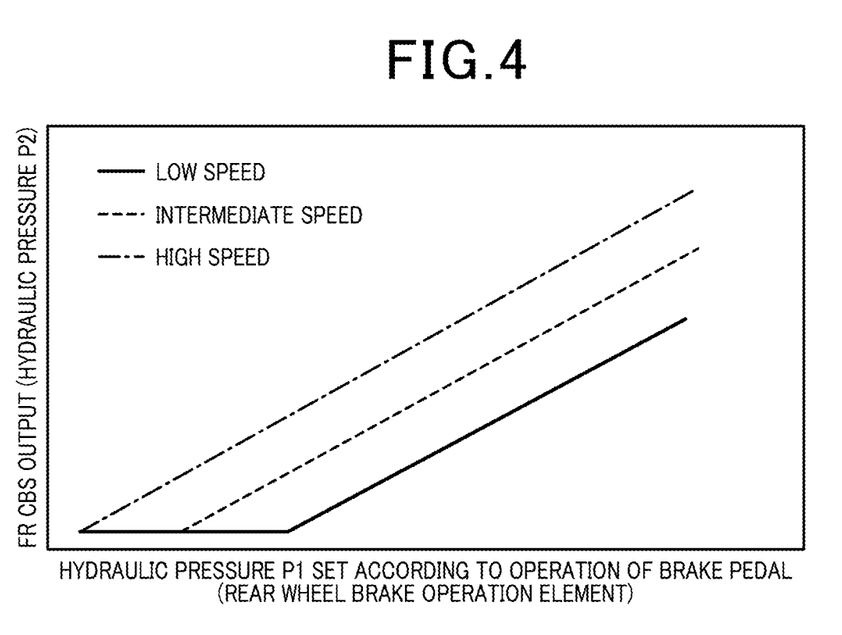
FIG. 4 is a drawing showing an example of a relationship between brake control force acting on a rear wheel and braking force (FC CBS output) acting on a front wheel brake.

FIG. 4 is a drawing showing an example of a relationship between the hydraulic pressure P1 set according to the operation of the brake pedal 21 (rear wheel brake operation element) and the brake force (the brake force is "FC CBS output" in FIG. 4, and the brake force is equivalent to the hydraulic pressure P2) acting on the second piston portion 15B of the front wheel brake 12.

In the example in FIG. 4, the vehicle speed VC is classified into three speed zones, that is, low speed, intermediate speed, and high speed. Then, by setting to the target value DT correlated with each of the speed zones, the brake force acting on the second piston portion 15B of the front wheel brake 12 is set to be greater as the vehicle speed VC is higher, and is set to be smaller as the vehicle speed VC is lower.

Herewith, at high vehicle speed, a distribution ratio of the brake force to the front wheel brake 12 with respect to the rear wheel brake 22 is increased, and the brake control enabling efficient braking is achieved.

On the other hand, at low vehicle speed, the distribution ratio of the brake force to the front wheel brake 12 with respect to the rear wheel brake 22 is reduced, and the brake control enabling a suppress motion of vehicle body pitching (so called pitching motion) when the front wheel is suddenly decelerated at low speed is achieved. Thereby, the appropriate brake control can be performed according to the vehicle speed.

Note that the front combined wheel closing valve 171 is maintained to the closed condition until the differential pressure PX reaches the target value DT. For this reason, the hydraulic pressure P2 acting on the second piston portion 15B is not increased until the hydraulic pressure P1 generated according to the operation of the brake pedal 21 reaches at least the target value DT.

Figure 5:
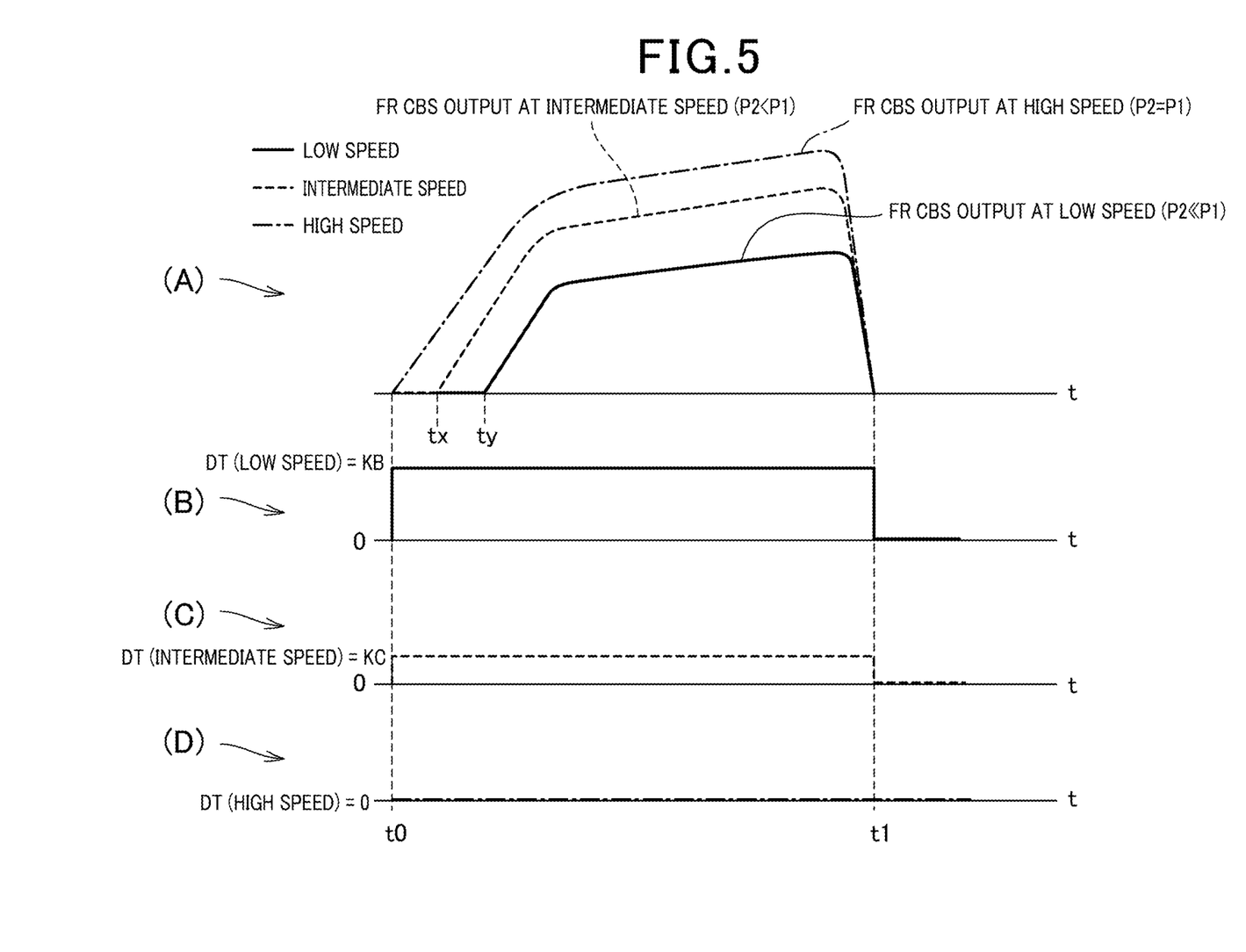
FIG. 5 is a drawing showing an example of time variations of both a target value and braking force (FR CBS output) when the target value at high speed is reduced to zero. Graph A shows the time variations of the braking force (FR CBS output), Graph B shows the time variations of the target value at low speed, Graph C shows the time variations of the target value at intermediate speed, and Graph D shows the time variations of the target value at high speed.

FIG. 5 is a drawing showing an example of time variations of both the target value DT and the braking force (FR CBS output) when the target value DT at high speed is reduced to zero. Graph A shows the time variations of the braking force (FR CBS output), Graph B shows the time variations of the target value DT at low speed, Graph C shows the time variations of the target value DT at intermediate speed, and Graph D shows the time variations of the target value DT at high speed. Note that in FIG. 5, a horizontal line shows elapsed time t, time t0 is indicative of an operation starting time point of the brake pedal 21, and time t1 is indicative of an operation finishing time point of the brake pedal 21. Also, time tx is a time point with the hydraulic pressure P1 reaching the target value DT set at intermediate speed, and time ty is a time point with the hydraulic pressure P1 reaching the target value DT set at low speed.

In the present structure, the target value DT is set based on the original (operation starting time point) vehicle speed VC with the brake pedal 21 operated. For this reason, as shown in Graph B, Graph C and Graph D, after the target value DT is set, the target value DT is maintained to a constant value. Thereby, the change in the target value DT can be suppressed during operation of the brake, and a stable brake feeling can be obtained.

Also in this case, in the same way as FIG. 4, the target value DT is set to the smaller value as the vehicle speed VC is higher. Thereby, as shown in Graph A, at high vehicle speed, the distribution ratio of the brake force to the front wheel brake 12 with respect to the rear wheel brake 22 is increased, and the brake control enabling the efficient braking is achieved. Also, at low vehicle speed, the distribution ratio of the brake force to the front wheel brake 12 with respect to the rear wheel brake 22 is reduced, and the brake control advantageous to suppression of the pitching motion is achieved.

More specifically, at low speed, as shown in Graph B, the target value DT is set to a target value KB at low speed, and at intermediate speed, as shown in Graph C, the target value DT is set to a target value KC at intermediate speed. The target value KB at low speed is greater than zero, and is a value to set the differential pressure PX to a predetermined value with the hydraulic pressure P2 sufficiently reduced in comparison with the hydraulic pressure P1. Thereby, as shown in Graph A, the brake force (FR CBS output) at low speed is set to the brake force (in Graph A, a condition shown by P2<<P1) acquired from the hydraulic pressure sufficiently lower than the hydraulic pressure P1 set according to the operation of the brake pedal 21.

The target value KC at intermediate speed is a value smaller than the target value KB at low speed, and is the value larger than zero. The target value KC at intermediate speed is the value to set the differential pressure PX to a predetermined value with the hydraulic pressure P2 set lower than the hydraulic pressure P1. Thereby, as shown in Graph A, the brake force (FR CBS output) at low speed is set to the brake force (in Graph A, the condition shown by P2<P1) acquired from the hydraulic pressure lower than the hydraulic pressure P1 set according to the operation of the brake pedal 21.

Note that the above-described target values KB, KC have only to be appropriately set according to the required specifications of the motorcycle.

As shown in Graph D, at high speed, the target value DT is set to zero (DT=0). Thereby, the differential pressure PX is controlled to zero (PX=0). With this control, as shown in Graph A, the brake force (FR CBS output (equivalent to the hydraulic pressure P2)) at high speed is set to the brake force acquired from the hydraulic pressure P1 set according to the operation of the brake pedal 21 (in Graph A, the condition shown by P2=P1). At high speed, the hydraulic pressure P1 set according to the operation of the brake pedal 21 directly acts on the second piston portion 15B of the front wheel brake 12. For this reason, the brake force by the second piston portion 15B of the front wheel brake 12 can be maximized. In view of this, efficient braking can be performed at high vehicle speed.

Note that the target value DT is reset to the operation finishing time point (time t1) of the brake pedal 21, and is subsequently set to a new time point when the brake pedal 21 is operated.

As has been described above, in the present embodiment, the pressure sensor 157, the pipe 170, and the control unit 200 are provided. The pressure sensor 157 functions as the first detection portion for detecting the hydraulic pressure P1 set according to the operation of the brake pedal 21 as the rear wheel brake operation element. The pipe 170 functions as the flow passage for connecting the rear wheel-side master cylinder 152 and the second piston portion 15B of the front wheel brake 12 to each other. The control unit 200 functions as the second detection portion for detecting the hydraulic pressure P2 acting on the second piston portion 15B through the pipe 170. Further, the control unit 200 controls the differential pressure PX between the hydraulic pressure P1 and the hydraulic pressure P2 to the target value DT set according to the vehicle speed VC.

Hereupon, during the operation of the brake pedal 21, the front wheel can be finely braked by the braking force adapted to the vehicle speed VC. Therefore, the brake feeling of each of the front and rear wheel brakes 12, 22 (combined brakes) is improved.

Also, in the control unit 200, the target value DT is set to the smaller value as the vehicle speed VC is higher. For this reason, the brake control enabling efficient braking is performed as the vehicle speed VC is higher, and the brake control advantageous to suppression of the vehicle body pitching is performed as the vehicle speed VC is lower. Thereby, control with the braking force and vehicle body stabilization during braking balancing with each other can be achieved, and the brake feeling is improved.

Further, in the control unit 200, the value set according to the original vehicle speed VC with the brake pedal 21 operated is set as the target value DT. For this reason, the change in the target value DT is suppressed during brake operation, and the stable brake feeling is obtained.

Also, the front combined wheel closing valve 171 is provided, and functions as the opening regulating valve for regulating the opening of the pipe 170. The control unit 200 controls the opening of the front combined wheel closing valve 171 so that the differential pressure PX between the hydraulic pressure P1 and the hydraulic pressure P2 reaches the target value DT. For this reason, the brake feeling is improved by a simple structure.

Further, the control unit 200 specifies the hydraulic pressure P2 based on the hydraulic pressure P1 detected by the pressure sensor 157 and the opening of the front combined wheel closing valve 171. The hydraulic pressure P2 acts on the second piston portion 15B of the front wheel brake 12 through the pipe 170. Thereby, the pressure sensor for directly detecting the hydraulic pressure P2 is no more required, and it is advantageous to reduce the number of components.

Note that if the number of components can be increased, the pressure sensor for detecting the hydraulic pressure P2 may be provided.

The above-described embodiment is absolutely one embodiment of the present invention. Various design modifications and application may be optionally made within the scope not departing from the gist of the present invention.

For example, in the above-described embodiment, such explanation is made that the rear wheel brake operation element is the brake pedal 21. However, the rear wheel brake operation element is not limited to the brake pedal 21. A rear wheel brake operation element included in the known motorcycle can be widely applied.

Also, in the above-described embodiment, such explanation is made that the target valve DT is set to the smaller value as the vehicle speed VC is higher. However, the present invention is not limited to the above-described case. In short, the target value DT may be appropriately changed within a range of using the target value DT set according to the vehicle speed VC.

Also, the structure of the front wheel brake 12, the rear wheel brake 22, the hydraulic circuit 100 or the like in the above-described embodiment is absolutely one example. Various kinds of known front wheel brakes and rear wheel brakes may be applied, and a circuit structure of the hydraulic circuit 100 can be appropriately changed.

Also, in the above-described embodiment, the target value DT is maintained to the constant value. However, the target value DT may be varied according to the hydraulic pressure P1 set according to the operation of the rear wheel brake operation element.

Also, in the above-described embodiment, such explanation is made that the hydraulic pressure according to the operation of the brake pedal 21 is detected by using the pressure sensor 157. However, the present invention is not limited to the above-described case. For example, the hydraulic pressure according to the operation of the brake pedal 21 may be detected by detecting a stroke of the brake pedal 21.

Also, in the above-described embodiment, such explanation is made that when only the rear wheel is braked, the first brake control and the second brake control are performed. However, the first brake control may be omitted if sufficient braking force for the front wheel can be ensured by the second brake control.

Also, in the above-described embodiment, such explanation is made that the present invention is applied to the brake system (brake control device) 10 for the large-sized motorcycle. However, the present invention is not limited to the above-described case. For example, the present invention may be applied to the brake system (brake control device) for the vehicle having front and rear wheels such as the saddle riding vehicle. The saddle riding vehicles include the general vehicles with a rider riding in a striding manner. The saddle riding vehicles are vehicles not limited to the motorcycles (including also motorized bicycles) but also including other two-wheeled vehicles such as bicycles, and three-wheeled vehicles and four-wheeled vehicles such as ATVs (All Terrain Vehicles). Also, the vehicles are not limited to a type driven by an engine (internal combustion engine). The vehicles may be an electric type driven by the motor.

REFERENCE SIGNS LIST

10 . . . Brake system (brake control device)
11 . . . Brake lever (front wheel brake operation element)

12 ... Front wheel brake
15 ... Front wheel caliper
15A ... First piston portion
15B ... Second piston portion
21 ... Brake pedal (rear wheel brake operation element)
22 ... Rear wheel brake
25 ... Rear wheel caliper
25A ... Piston portion
100 ... Hydraulic circuit
111 ... First hydraulic circuit
151 ... Second hydraulic circuit
152 ... Rear wheel-side master cylinder
157 ... Pressure sensor (first detection portion)
170 ... Pipe (flow passage)
171 ... Front combined wheel closing valve (opening regulating valve)
200 ... Control unit (second detection portion)
P1, P2 ... Hydraulic pressure
PX ... Differential pressure
VC ... Vehicle speed
DT ... Target value
KB, DT1, DT2 ... Target value at low speed
KC ... Target value at intermediate speed
t ... Elapsed time

The invention claimed is:

1. A brake control device for a saddle riding vehicle comprising:
a rear wheel brake operation element for operating a rear wheel brake;
a master cylinder for generating hydraulic pressure according to operation of the rear wheel brake operation element;
a first detection portion for detecting a first hydraulic pressure generated according to the operation of the rear wheel brake operation element;
a front wheel brake; and
a flow passage configured to connect the master cylinder and the front wheel brake to each other,
a second detection portion for detecting a second hydraulic pressure acting on the front wheel brake through the flow passage; and
a control unit for controlling at least one of the first and second hydraulic pressures such that a difference between the first and second hydraulic pressures detected by the first and second detection portions is set to a target value said target value being based upon a vehicle speed of the saddle riding vehicle,
wherein the control unit sets the target value to a smaller value as the vehicle speed is higher.

2. The brake control device for a saddle riding vehicle according to claim 1, further comprising
an opening regulating valve for regulating an opening of the flow passage,
wherein the control unit controls the opening of the opening regulating valve in order to set the difference between the first and second hydraulic pressures to the target value.

3. The brake control device for a saddle riding vehicle according to claim 2, wherein the second detection portion determines the hydraulic pressure acting on the front wheel brake through the flow passage based on the hydraulic pressure detected by the first detection portion and the opening of the opening regulating valve.

4. The brake control device for a saddle riding vehicle according to claim 3, wherein the first detection portion is a pressure sensor, and
wherein the control unit functions as the second detection portion, and controls the opening of the opening regulating valve in order to make the difference in the hydraulic pressure being detected by the pressure sensor and the control unit to reach the target value according to vehicle speed of the saddle riding vehicle.

5. The brake control device for a saddle riding vehicle according to claim 1, wherein the control unit sets the target value according to an original vehicle speed with the rear wheel brake operation element operated.

* * * * *